United States Patent

[11] 3,621,013

[72] Inventors Erhardt Winkelmann
Kelkheim/Taunus;
Wolfgang Raether, Dreieichenhain, both of Germany
[21] Appl. No. 811,642
[22] Filed Mar. 28, 1969
[45] Patented Nov. 16, 1971
[73] Assignee Farbwerke Hoechst Aktiengesellschaft
Vormals Meister Lucius & Brunning
Frankfurt/Main, Germany
[32] Priority Apr. 9, 1968
[33] Germany
[31] P 17 70 162.1

[54] FORMAMIDINE COMPOUNDS OF DIPHENYL-SULFONE
4 Claims, No Drawings
[52] U.S. Cl. .................. 260/239.6,
260/239.7, 260/239.8, 424/248, 424/267, 424/274
[51] Int. Cl. .................. C07d 87/38
[50] Field of Search .................. 260/240 G,
239.6, 239.7, 239.8

[56] References Cited
OTHER REFERENCES
Takubo et al., Yakugaku Zasshi 78, 1308– 10 (1958); C.A. 53:5172f.

Primary Examiner—Henry R. Jiles
Attorney—Curtis, Morris & Safford

ABSTRACT: Formamidine derivatives of diphenyl-sulfone which are effective medicaments against malaria are prepared by reacting 4,4'-diamino-diphenyl-sulfone of the formula

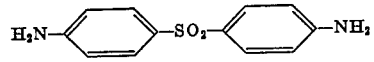

with N-formyl compounds of the formula

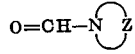

in which —N Z is a pyrrolidino, piperidino or morpholino radical, in the presence of acid halides and, if desired, converting the salts thus obtained into the free bases.

FORMAMIDINE COMPOUNDS OF DIPHENYL-SULFONE

The present invention relates to formamidine derivatives of diphenyl-sulfone of the formula

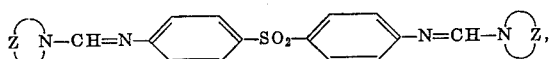

wherein Z together with the nitrogen atom is a pyrrolidino, piperidino or morpholine radical. The compounds of the invention are valuable medicaments effective against malaria. They are obtained by reacting 4,4'-diamino-diphenyl-sulfone of the formula

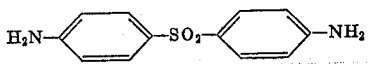

with N-formyl compounds of the formula

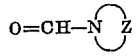

in which $-N\overset{\frown}{\underset{\smile}{}}Z$ is defined as above, in the presence of acid halides and, if desired converting the salts thus obtained into the free bases.

The N-formyl compounds used as starting substances are N-formyl-pyrrolidine, N-formyl-piperidine and N-formyl-morpholine, which are prepared by known methods.

As acid halides, the usual organic and inorganic halides, for example thionyl chloride, phosphoroxy chloride, chlorosulfonic acid, benzenesulfonic acid chloride and p-toluene-sulfonic acid chloride, phosgene, chloroformic acid ester and oxalyl chloride are used for the reaction.

The reaction components are advantageously reacted in equimolar amounts, i.e. 1 mol of 4,4'-diamino-diphenyl-sulfone with 2 mols of N-formyl compounds in 2 mols of acid halide; it is, however, also possible to use an excess of the two last-mentioned components. It is, in general, advantageous also to use a diluent or a distributing agent. Suitable reaction media are inert organic solvents, in particular ethers, for example di-isopropyl ether, tetrahydrofurane, dioxane, ethylene-glycol dialkyl ether, diethylene-glycol dialkyl ether. It is especially advantageous to use an excess of the N-formyl compound as the reaction medium. Unreacted N-formyl compound can be recovered after working up of the reaction mixture.

In most cases, the reaction is exothermic and proceeds at temperatures in the range of from 0° to 100° C., advantageously at room temperature. The reaction is completed after a few minutes to several hours depending on the reaction conditions.

In general, the reaction is carried out by dissolving 4,4-diamino-diphenyl-sulfone in a suitable solvent and adding the N-formyl compound thereto, or by dissolving only the sulfone in an excess of N-formyl compound and adding the acid halide dropwise while stirring.

When a solvent is used, the reaction products precipitate in the form of salts which can be isolated by suction-filtering. The free bases are obtained by introducing the salts or the reaction solution into aqueous alkaline or ammoniacal solutions. The bases are solid and can be isolated by suction-filtration or by extraction with a lipophilic solvent, and, optionally, they can be recrystallized from a suitable solvent such as, for example, as an alcohol, for example butanol.

The novel products of the invention may be used as medicaments. They are especially suitable for the therapy and prophylaxis of diseases caused by plasmodia (malaria) and mycobacteria (tuberculosis and leprosy). When tested in mice, the compounds of the invention were found to be excellently effective, even in low dosages, against plasmodium berghei strains—even those that are resistant to the known therapeutic chloroquine-diphosphate (7-chloro-4-(4'-diethylamino-1'-methylbutylamino)-quinoline-diphosphate). The compounds also have a very low toxicity.

In pharmacological tests, the test animals were infected intraperitoneally with a mixture of 1 part of blood having more than 30 percent of its erythrocytes infected with plasmodium berghei, and 99 parts of a physiological sodium chloride solution. The animals were then treated with the compounds of the invention according to the following scheme

| | | |
|---|---|---|
| 1. Treatment beginning | 2 hours p.i. | subcutaneous |
| 2. Treatment beginning | 1 day p.i. | subcutaneous |
| 3. Treatment beginning | 2 days p.i. | subcutaneous |
| 4. Treatment beginning | 4 days p.i. | subcutaneous |
| 5. Treatment beginning | 5 days p.i. | subcutaneous |

The infection course of the treated animals was observed for 21 days by means of blood smear preparations stained according to Giemsa. Untreated control animals generally died 6 to 8 days after the infection.

The examinations on plasmodium berghei in stained blood smears are effected between the 6th and the 21st day after infection at intervals of 3 days in order to recognize relapsing animals. After this period, the experiment was terminated. As dosis curativa minima there was designated a dose capable of freeing the blood of the test animals from parasites within the test period of 21 days. The results of the examinations are summarized in tables 1 and 2.

The following compounds were examined:

I. 4,4'-bis-(N,N-tetramethylene-formamidino)-diphenyl-sulfone

II. 4,4'/-bis-(N,N-3-oxa-pentamethylene-formamidino)-diphenyl-sulfone.

TABLE 1
[Chemotherapeutical effect on mice infected with chloroquine-diphosphate-resistant plasmodium berghei]

| Compound | Dose in mg./kg. per os | Effect |
|---|---|---|
| Chloroquine diphosphate | 5×110 | Relapse. |
| I | 5×20 | Cured. |
| II | 5×40 | Do. |

TABLE 2.—TOXICITY IN MICE

| Compound: | In mg./kg. per os [1] |
|---|---|
| Chloroquine-diphosphate | 1×500 |
| I | 1×1500 |
| II | 1×>5000 |

[1] Dosis tolerata maxima.

The products of the invention may be administered parenterally, or preferably per os, in admixture with pharmaceutically suitable carriers. In case of administration per os, they are advantageously in the form of tablets, dragees or capsules, containing the active ingredients in admixture or conjunction with suitable carriers, such as lactose, starch, tragacanth, talc or magnesium stearate. The dosage unit is preferably from about 25 to 100 mg. but considerably higher or lower dosage units may also be used.

The following examples serve to illustrate the invention, but they are not intended to limit it thereto.

EXAMPLE 1

4,4'-bis-(N,N-tetramethylene-formamidino)-diphenyl-sulfone

A solution of 46 g. (0.3 mol) of phosphoroxy chloride in 100 cc. of anhydrous tetrahydrofurane was added dropwise, while cooling and stirring, at 10°–20° C. to 60 g. (0.6 mol) of N-formyl-pyrrolidine dissolved in 200 cc. of anhydrous tetrahydrofurane. Into this solution 24.8 g. (0.1 mol) of 4,4'-diamino-diphehyl-sulfone dissolved in 70 cc. of anhydrous ethylene-glycol dimethyl ether were introduced dropwise at 20°–30° C. while cooling and stirring carefully. Towards the end of the reaction, the end product began to precipitate in salt form and stirring was continued for another hour at room temperature. The salt was suction-filtered, washed with tetrahydrofurane, dried in the air and introduced, with cooling and fair stirring, into 1,000 cc. of 2N-ammonia at room temperature. The free base which had precipitated was suction-filtered, washed with water and recrystallized from n-butanol.

24 g. (58 percent of the theory) of 4,4'-bis-(N,N-tetramethylene-formamidino)-diphenyl-sulfone were obtained in the form of yellow crystals that melted at 198°–199° C.

In an analogous manner there were obtained 4,4'-bis-(N,N-pentamethylene-formamidino)-diphenyl-sulfone, (m.p. 203°–204° C.) in a yield of 81 percent, and 4,4'-bis-(N,N-3-oxa-pentamethylene-formamidino)-diphenyl-sulfone, (m.p. 200°–202° C.) in a yield of 62 percent

EXAMPLE 2

4,4'-bis-(N,N-tetramethylene-formamidino)-diphenyl-sulfone 34 g. (0.22 mol) of phosphoroxy chloride were added dropwise, while cooling and stirring, at 30°–40° C. to a solution of 24.8 g. (0.1 mol) of 4,4'-diamino-diphenyl-sulfone in 99 g. (1 mol) of N-formyl-pyrrolidine. Stirring was continued for another hour at room temperature and subsequently 500 cc. of anhydrous acetone or methylene chloride were added with continued stirring. The precipitate was suction-filtered, washed with acetone, dried in the air and introduced with fair stirring into 1,000 cc. of 2N-ammonia. The free base thus formed was suction-filtered, washed with water and recrystallized from n-butanol.

26 g., (64 percent of the theory) of 4,4'-bis-(N,N-tetramethylene-formamidino)-diphenyl-sulfone, m.p. 200° C. were obtained.

We claim:

1. A member selected from the group of formamidines of the formula

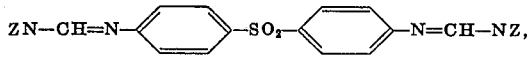

wherein Z, taken with the nitrogen atom, is pyrrolidino, piperidino, or morpholino.

2. 4,4'-bis-(N,N-tetramethylene-formamidino)-diphenyl-sulfone.

3. 4,4'-bis-(N,N-pentamethylene-formamidino)-diphenyl-sulfone.

4. 4,4'-bis-(N,N-3-oxa-pentamethylene-formamidino)-diphenyl-sulfone.